United States Patent [19]

Michelotti

[11] Patent Number: 4,530,456

[45] Date of Patent: Jul. 23, 1985

[54] METHOD AND APPARATUS FOR SOLDERING BY MEANS OF AN INDUSTRIAL ROBOT

[75] Inventor: Donald P. Michelotti, Gibsonia, Pa.

[73] Assignee: PPG Industries, Inc., Pittsburgh, Pa.

[21] Appl. No.: 491,467

[22] Filed: May 4, 1983

[51] Int. Cl.³ .................... B23K 31/02; H01L 21/58
[52] U.S. Cl. .................................. 228/102; 228/6.2; 228/8; 228/9; 901/46
[58] Field of Search .............. 228/6, 8, 9, 10, 11, 228/41, 46, 47, 49, 102; 219/85 Q; 901/42, 46; 318/587, 653, 672, 673

[56] References Cited

U.S. PATENT DOCUMENTS

| | | | |
|---|---|---|---|
| 3,685,714 | 8/1972 | Moyer et al. | 228/6 |
| 3,830,420 | 8/1974 | Milana et al. | 228/41 |
| 3,940,046 | 2/1976 | Fern | 228/8 |
| 3,995,140 | 11/1976 | Kuiff et al. | 219/203 |
| 4,042,161 | 8/1977 | Ando | 901/46 |
| 4,199,674 | 4/1980 | Keser et al. | 318/653 |
| 4,230,257 | 10/1980 | Genson | 228/41 |
| 4,298,154 | 11/1981 | DeFusco | 228/49 R |
| 4,310,958 | 1/1982 | Balaud et al. | 901/42 |
| 4,373,657 | 2/1983 | Fillon | 228/11 |
| 4,415,116 | 11/1983 | Norton | 228/180 A |
| 4,444,349 | 4/1984 | Bilane et al. | 228/182 |

*Primary Examiner*—Nicholas P. Godici
*Assistant Examiner*—M. Jordan
*Attorney, Agent, or Firm*—Robert A. Westerlund, Jr.; Donald Carl Lepiane

[57] ABSTRACT

A method and apparatus for soldering by means of an industrial robot is disclosed. The apparatus includes a soldering head end effector having retractable continuity sensing probes. The soldering head is particularly adapted to solder metal connector braids onto fused silver ceramic frit bus bars which are associated with the heating elements of defogging automobile back lights. The method includes positioning the work piece sensing the alignment of the bus bar and braid, controlling the robot to its starting position, controlling the robot soldering heat to subsequent preprogrammed soldering positions, holding the connector braid onto the bus bar and soldering the work piece.

16 Claims, 5 Drawing Figures

METHOD AND APPARATUS FOR SOLDERING BY MEANS OF AN INDUSTRIAL ROBOT

BACKGROUND OF THE INVENTION

This invention relates to an industrial robot manipulator arm end effector and particularly to an end effector adapted to sense, position, and solder work pieces in a manufacturing process.

DISCUSSION OF THE TECHNICAL DIFFICULTY

Windows for automobiles and particularly back lights used for automobiles are commonly provided with electric heating elements for defrosting and defogging. Such back lights are generally made from a pattern cut flat glass sheet thermally bent or molded to fit the particular automobile window opening. Prior to the heating and bending of the glass sheet a number of narrow, spaced, parallel lines of a conducting material is placed on the inside vision area of the glass. The parallel lines are connected on opposite adjacent margins thereof by strip electrodes of the same material which is generally a ceramic frit containing silver or silver oxide. Upon the heat of bending or tempering, the lines and strip electrode buses are fired onto the glass so that the pattern becomes part of the glass substrate. In order to electrically connect the heating elements to the automobile, it is necessary to attach flexible connectors made of braided wire or connector clips onto the strip electrodes. In this manner, the automobile's electrical power source serves to produce resistance heating in the parallel strips to defog or defrost the glass.

Normally the silver or silver oxide frit is applied by silk screening the pattern to one surface of the sheet of glass while the glass is still flat. During the subsequent treatment of the sheet by heating and bending the glass to the desired curvature, the frit material becomes tightly bonded to the glass surface. It has been found that conventional soldering techniques are satisfactory for welding or soldering the connector braids to the frit electrode bus strips. The soldering process thus has largely been a manual operation utilizing a number of soldering irons and individual operators.

Not all electrical connections between the frit pattern bus bars and the electrical power elements of the automobile utilize a braid connector. Some patterns utilize a nonflexible metal strip or clip which also must be attached by soldering to the bus bar. The nonflexible clips are likewise normally applied by the use of manual soldering techniques.

One attempt to automate the soldering of the flexible braided connectors onto the strip bus bar is disclosed in U.S. Pat. No. 3,685,714 to Moyer et al. The Moyer soldering apparatus utilizes a dedicated machine which is not as flexible as an industrial robot. An attempt to automate the connection of nonflexible clips onto the bus bars on glass sheets is disclosed in U.S. Pat. No. 3,995,140 to Kuiff et al. The Kuiff patent is also a dedicated machine.

While both the Moyer and Kuiff inventions are directed to automating what would otherwise be a manual operation, both inventions require a high production rate of a single pattern to justify using the invention over conventional manual techniques.

The manufacturing world is rapidly turning to so-called flexible manufacturing systems that allow the productivity gains and asset utilization rates normally associated with high volume hard dedicated automation, yet are flexible enough to be reprogrammed to make new parts or products. A single, flexible system can replace several different dedicated conventional lines therefore yielding considerable savings of capital investment and plant size. Flexible manufacturing, while allowing for economies of scale can also produce small volume parts for small market segments. Flexible systems thus allow both high production rates as well as batch production.

The key tool in a flexible manufacturing system is the industrial robot. Industrial robots are programmable individually and adapted to connection with system controllers. Manufacturers of industrial robots have developed a wide variety of robots. Most robots, however, are provided with a manipulator arm which is given wide degrees of motion within a prescribed working range. Such robots manipulator arms move in the X, Y, Z directions as well as rotate about one or more axis.

In order to provide the flexibility necessary in the manufacturing of a electrically heated back light for an automobile, it is desirable to utilize an industrial robot to automate the application of braid or clip connectors onto the fused frit bus bars. This is particularly true since numerous parts having different dimensions, configurations of bend, line patterns and other parameters are produced in the automotive industry.

It would also be desirable to provide a manipulator arm end effector having an appropriate soldering head which would sense the position of the bus bar and braid or connector and apply the heat and solder, as appropriate, in as many solder locations as necessary while still maintaining the flexibility inherent in using an industrial robot. The instant invention is directed toward this and other needs that will become apparent upon a careful reading of the specification including the summary and drawings.

SUMMARY OF THE INVENTION

The invention relates generally to a tool for use on the end of an industrial robot manipulator arm. The tool senses the position of a workpiece to be soldered by sensing continuity between a pair of retractable probes mounted on the tool. Once the position of the workpiece is known, the robot by preprogrammed control advances to the first soldering position and commences to solder by use of retractable electrical heating element soldering iron having an automatically advancing solder wire bead and a workpiece hold down. The soldering iron are of the end effector is provided with a concentric sheath surrounding the soldering head by which inert gas or a reducing gas is injected to create a noncorrosive atmosphere in the vicinity of the solder weld.

The invention is particularly adapted to soldering connector braids and clips onto heat fused silver frit oxide bus bars on automobile back lights but can be adapted by simply reprogramming the robot to perform soldering operations on other work pieces as well.

In order to perform at an optimal level of efficiency, the work piece should be advanced into the working range of the robot manipulator arm and properly positioned. The positioning can be accomplished by conventional squaring devices as well as by the squaring table disclosed in U.S. patent application Ser. No. 392,393 entitled "Glass Sheet Positioning Apparatus for Conveyor Platform" which disclosure is hereby incorporated by reference.

By use of the instant invention a wide variety of parts can be manufactured without the necessity for high volume production of each part. Manual labor is considerably reduced and the solder welds maintain a high degree of reliability and uniformity.

The instant invention is directed to an apparatus for attachment to an industrial robot end of manipulator arm effector as well as to methods for soldering using such an apparatus. The methods include the steps of positioning the workpiece, sensing the location of the workpiece, controlling the robot within the soldering head end effector to a first solder weld location, guiding the solder head to subsequent solder weld locations, holding the braid onto the ceramic frit bus bar, and soldering the workpiece. The methods also include advancing the solder in the soldering head in the end of arm effector tool by a solder wire feed mechanism and providing an inert or reducing atmosphere in the vicinity of the solder welds. Additional steps of supporting the workpiece with retractable supports blocks and utilizing a pair of robots on either side of the workpiece flow path with each robot having a solder head end of arm effector as previously discussed, is also within the scope of the invention.

In order that the invention may be more clearly understood, there are the preferred embodiments of the invention which will now be described in reference to the accompanying drawings.

DESCRIPTION OF THE PREFERRED EMBODIMENTS

Figure 1:
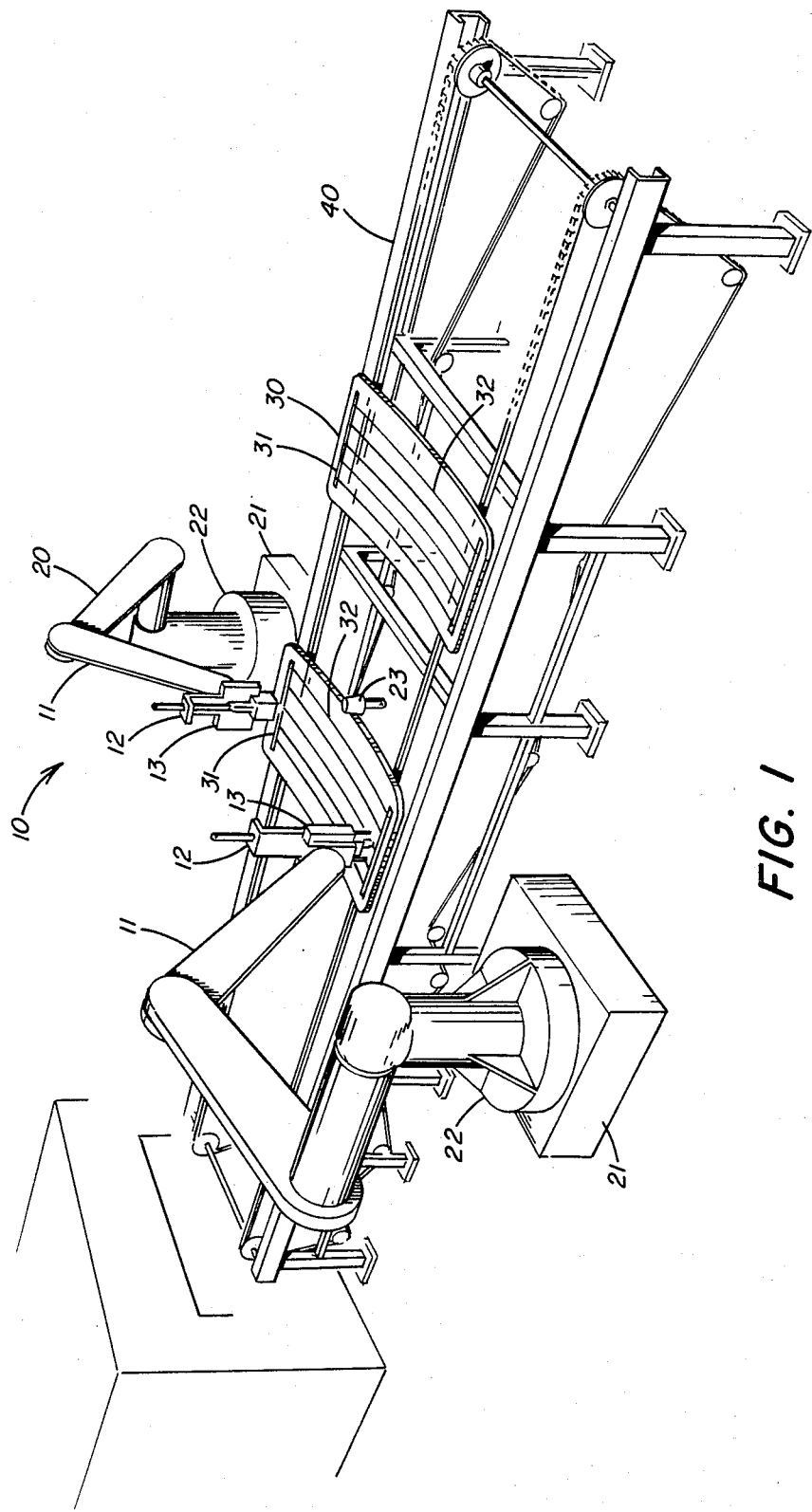
FIG. 1 is a perspective view of a soldering assembly line for soldering connector braids onto automobile backlights advancing along a conveyor.

The apparatus 10 is shown in operation attached to a pair of industrial robots in an assembly manufacturing conveyor line as shown generally in FIG. 1. The horizontal conveyor 40 is shown to be a dual endless belt type conveyor, however any horizontal conveyor generally known in the art which has a frame, a work piece moving means, and associated drive equipment could be employed. In the preferred embodiment, as shown in FIG. 1, a pair of industrial robots 20 are positioned on either side of assembly line 10. Conveyor 40 is provided with work piece stop 23 which stops the work piece within the working range of the manipulator arm 11 of robot 20 so that the end effector 13 is in position to sense and solder connector braid 31. Industrial robots 20 are generally mounted upon a rotatable support 22 which is rigidly attached to mounting block 21 or to the floor itself. Such a rigid mounting is necessary because the positioning and soldering of the work piece must be exact and repeatable. Conveyor 40 could be controlled with a system programmable controller (not shown) which could also be controlled by a programmable controller for the industrial robot (not shown). When the appropriate software is produced linking the industrial robots 20 to the controller for conveyor 40, conveyor 40 could be stopped in the correct position. Movable stop 23 which is controlled by the programable controller for the conveyor or the conveyor itself could be likewise controlled. Upon the work piece 30 contacting movable stop 23, a switch could be activated which would stop the conveyor 40. Also more than a single stop 23 could be used. Vertically moving supports (not shown) could be placed beneath the work piece depending upon the pattern of curvature and shape of the pattern of the workpiece. Where glass automobile back lights 30 are being soldered having parallel heater lines 32 and bus bars 31, it has been found that stability is improved with a support beneath the glass surface of work piece 30.

Figure 3:
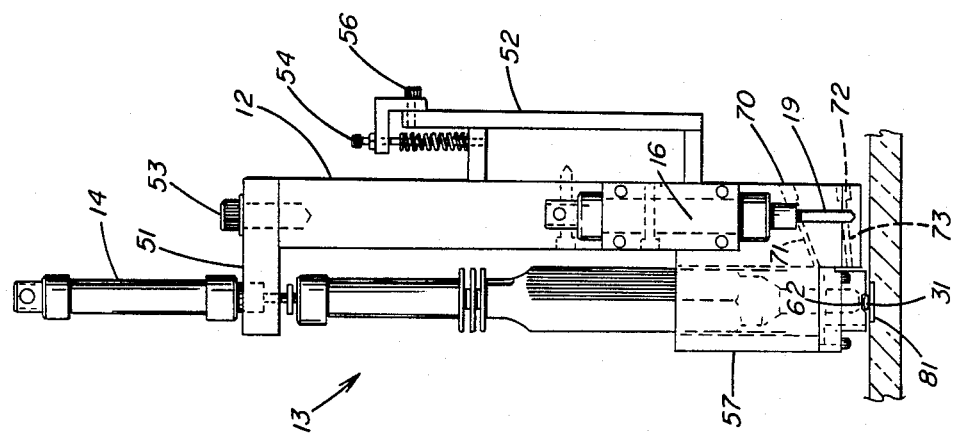
FIG. 3 is a left side elevational view of the robot manipulator arm end of arm effector showing the soldering iron in position for soldering with a connector braid and glass sheet shown in section.
Figure 2:
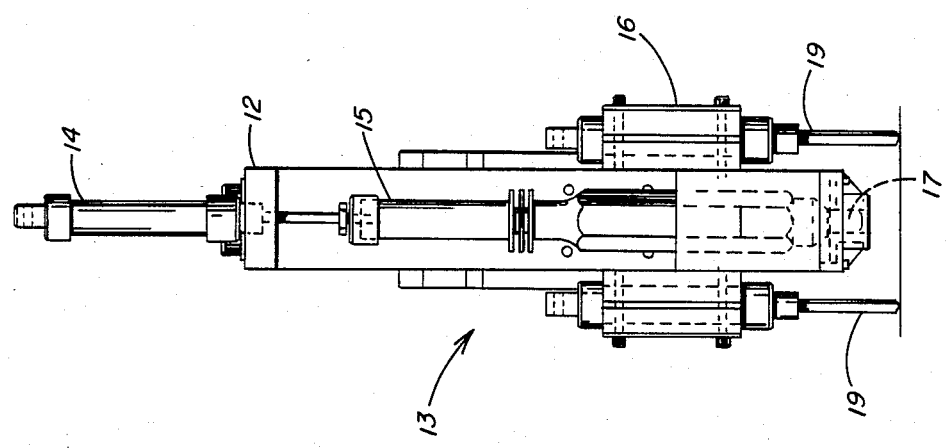
FIG. 2 is a front elevational view of the robot manipulator arm end of arm effector showing the soldering iron in a raised position with the sensing probes extended.

With reference to FIG. 2, the soldering head end of arm effector for the manipulator arm 11 of robot 20 is depicted. The end of arm effector 13 shown in FIG. 2 includes a soldering iron tip 17 which can be raised and lowered by means of air cylinder 14. The soldering iron 17 is an electrical soldering from having electrical heating elements within upper portion 15. Activation of air cylinder 14 raises and lowers the soldering tip 17 with respect to frame 12. Frame 12 as shown in FIG. 3 is a C-shaped frame having upper horizontal plate 51 attached by means of screws 53 into vertical frame member 59. C-shaped frame 12 is further provided with robot manipulator attachment clamp 52 which allows for attachment to the manipulator arm of the industrial robot by means of connector screw 54 and 56.

FIG. 2 depicts the manipulator arm end effector in a sensing position wherein the soldering tip 17 is recessed with respect to work piece contact 18 and sensing members 19 are extended. Sensing members 19 are raised and lowered utilizing an air cylinder 16. The sensing elements 19 provide contact points so that a complete circuit is made when an elecicity conducting material is placed between sensing elements 19. When sensing elements 19 touch a bus bar which is conductive, the contact initiates a sequence in the robot controller which raises the sensing probes 19 out of the way, advances the soldering iron to a first starting position, lowers the end of arm effector to contact the glass with guide 18, and soldering tip 17 is in position to solder as depicted in FIG. 3. FIG. 3 further shows that solder can be advanced through channel 73 to come in contact with soldering tip 17 as needed. An automatic feed such as a rachet mechanism can be employed as can any other conventional automatic solder feed mechanism.

Figure 4:
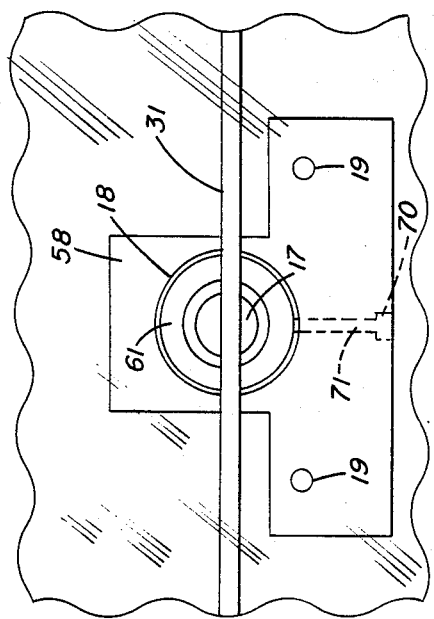
FIG. 4 is a bottom plan view of a end of arm effector in position for soldering onto a depicted connector braid.

With reference to FIG. 3, it can be shown that a second channel 71 is included in lower frame member 57 which can be connected to a source of inert gas or a reducing gas through connection port 70. Channel 71 is in pneumatic communication with concentric opening 61 as depicted in FIG. 4. Opening 61 provides a concentric area surrounding the soldering tip 17 by which the inert or reducing gas can be ejected to create a non-corrosive atmosphere in the vicinity of the solder weld. Also, with reference to FIG. 4, it can be shown that outer sheath 18 is so configured to straddle braid 31 when soldering a soldering braid connector 31 to the glass sheet bus bar.

Figure 5:
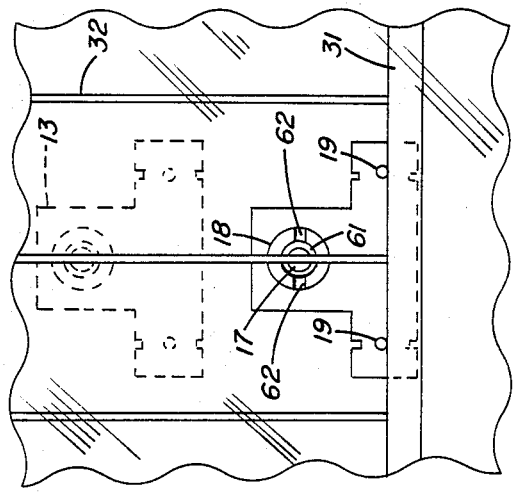
FIG. 5 is a bottom plan view looking through a automobile backlight having a frit heating element pattern showing the end of arm effector in a first position shown in dashed lines and in a second sensing position wherein the sensing probes make contact along the bus bar.

With reference to FIG. 5 it can be shown that the first position in dashed lines of the end of arm effector places the sensing probes 19 against the glass. The end of arm effectors in the configuration as shown in FIG. 2 with the probes extended and the soldering iron tip 17 raised with respect to a glass contact point 18. When the end of arm effector 13 is advanced to the second position shown in solid line, probes 19 make contact with conducting bus bar so as to close the circuit thereby signalling the robot control to sequence to the raising of the sensing probes by means of retracting air cylinder 16 and the advancing of the soldering head to a soldering position as shown in FIG. 3 with glass contact point 18 having guide channel 62 stradling braid 31. At this point the electricity is applied through heating elements 15 to soldering iron tip 17 thus making the solder weld. Subsequent solder welds are made by having the robot manipulator arm 11 within end of arm effector moving along the bus bar guiding the braid by use of guide 62. The movement of the end of arm effector is preprogrammed according to the pattern that is to be produced. If the clip connectors rather than the braid connectors 31 are to be used the robot would produce only a single solder weld or possibly only one solder weld as the connectors are quite a bit shorter.

It has been found that the flux for producing the solder weld is best applied to the braid bus bar interface by dipping the braid 31 into a flux such as a rosin flux prior to placing against the ceramic frit bus bar. In order to hold the braid 31 against the bus bar, it has been found that separate clips can attach the braid initially or it can be placed by automated equipment, or quite possible by the use of the robot end effector itself.

The steps that the end of arm effector 13 takes in producing solder welds necessary for soldering the braid connectors 31 onto the bus bars include a first positioning of the work piece within the working range of the robot arm, lowering the end of arm effector to a position in which the sensing probes 19 touch the glass while maintaining the glass contact point 18 away from contact with glass as shown in FIG. 2, controlling the end of arm effector toward the bus bar to a second position as shown in FIG. 5 wherein contact is made with the bus bar. After contact is made with the bus bar, the probes 19 are retracted, the end of arm effector is advanced a known distance by use of a preprogrammed robot control to the bus bar location. At that point the end of arm effector is lowered to glass contact so that the glass contact point straddles braid 31 through channel 62. An inert or reducing atmosphere is produced through channel 71 and solder is applied through an automatic feed through channel 73 and the electrical heating elements 15 and heat soldering iron tips 17 so as to create the first solder weld. Subsequent solder welds are made by advancing the end of arm effector in the path of work piece movement or opposite the path of work piece movement or in any direction that is appropriate and can be controlled by the robot programmer. Subsequent weld positions can also be preprogrammed.

Once the appropriate solder welds are made in the work piece and particularly with bus bar braid connections it has been found that a pair of industrial robots such as shown in FIG. 1 work best as each robot can work on either side of a conveyor. Once a work piece is soldered, the conveyor controller lowers the movable stop 23 and the work piece advances to further manufacturing operations, testing, finishing or packaging operations.

As can now be appreciated from the foregoing description of the preferred embodiments, the invention is not limited to that example which was presented for illustration purposes only. It is understood that other steps, examples, components and methods of operation will occur to those skilled in the art, from a thorough reading of this disclosure without departing from the scope of the invention as claimed hereafter.

I claim:

1. A method for soldering an item to a workpiece having electrically conductive and electrically non-conductive portions, with an industrial robot having a soldering head end effector, comprising the steps of:
   positioning the workpiece within the working range of the robot;
   activating a workpiece contacting conductivity sensor means associated with the soldering head end effector to contact the workpiece and to sense the presence of the electrically conductive portion of the workpiece;
   controlling the robot to move the soldering head to a first soldering position in response to said sensor means; and
   soldering the item to the workpiece electrically conductive portion.

2. The method as set forth in claim 1, wherein said activating step comprises moving said sensor means across the workpiece to sense the workpiece electrically conductive portion, and further including the step of moving said sensor means into an inoperative position out of contact with the workpiece after said activating step.

3. The method as set forth in claim 2, wherein said sensing means comprises a pair of spaced probes reciprocably mounted to the end effector and electrically connected to an electric circuit which is energized when both probes come into contact with the workpiece electrically conductive portion, and wherein further, said controlling step comprises said electric circuit, upon being energized, conveying a signal to a robot controlling means to cause the robot to move the soldering head to said first soldering position.

4. The method as set forth in claim 3, further comprising the step of said robot controlling causing the robot to move the soldering head to subsequent soldering positions other than said first soldering position.

5. The method as set forth in claim 4, wherein said robot controlling means comprises a programmable controller functionally interfaced with the robot.

6. The method as set forth in claim 3, wherein said soldering step includes reciprocating said sensing means relative to the soldering head between an inoperative position out of contact with the workpiece and an operative soldering position at least more proximal to the workpiece.

7. The method as set forth in claim 3, further comprising the steps of:
   moving said soldering means into said inoperative position after said soldering step;
   said robot controlling means causing the robot to move the soldering head to a second soldering position;
   moving said soldering means into said operative position; and
   repeating said soldering step.

8. The method as set forth in claim 7, further comprising the step of said robot controlling means causing the robot to move the soldering head to subsequent soldering positions other than said first and second soldering positions.

9. The method as set forth in claim 6, further comprising the step of supplying an inert or reducing gas, proximal to said first soldering position.

10. The method as set forth in claim 6, further comprising the step of holding the item between said soldering means and the workpiece electrically conductive portion, to at least substantially prevent relative movement of the item, during said soldering step.

11. The method as set forth in claim 10, wherein the item is an electrical connecting means, the workpiece electrically conductive portion is a bus bar, and the workpiece is a vehicular transparency.

12. An end effector apparatus, utilizable with a robot having a manipulator arm, for soldering an item to a workpiece having electrically conductive and electrically non-conductive portions, comprising:

frame means;

means for connecting said frame means to the manipulator arm;

means for sensing the presence of the electrically conductive portion of the workpiece, reciprocably mounted to said frame means for movement relative thereto between an inoperative position out of contact with the workpiece and an operative position in contact with the workpiece.

means for controlling the robot in response to said sensing means;

means for soldering the item to the workpiece, reciprocably mounted to said frame means for movement relative thereto between an inoperative position and an operative position.

13. The apparatus as set forth in claim 12, wherein the item is an electrical connector means, the electrically conductive portion is a bus bar, and the workpiece is a vehicular transparency.

14. The apparatus as set forth in claim 13, wherein it further comprises a means attached to said frame means for guiding said electrical connector means to control the position thereof relative to the bus bar.

15. The apparatus as set forth in claim 14, wherein said connector means guiding means comprises at least a pair of opposed channels formed in opposed bottom edge portions of a hollow sheath member attached to said frame means in at least partially surrounding relationship to said soldering means for reciprocating movement therewith.

16. The apparatus as set forth in claim 15, wherein said sensing means comprises a pair of spaced probes reciprocably mounted to said frame means and electrically connected to an electric circuit which is closed when both probes are in contact with said bus bar.

* * * * *